United States Patent [19]

Dewey

[11] 4,086,118

[45] Apr. 25, 1978

[54] RIGID COMPOSITE ARTICLES AND A METHOD FOR THEIR MANUFACTURE

[76] Inventor: Frank Dewey, 1020 Market St., St. Joseph, Mich. 64505

[21] Appl. No.: 729,395

[22] Filed: Oct. 4, 1976

[51] Int. Cl.² .................. B32B 33/00; B32B 27/40; B32B 27/38; B32B 13/02

[52] U.S. Cl. .................. 156/246; 156/249; 156/278; 264/300; 264/308; 428/327; 428/331; 428/417; 428/425; 428/908

[58] Field of Search .................. 156/246, 249, 278; 428/415, 417, 425, 539, 327, 331, 908; 264/255, 300, 308

[56] References Cited

U.S. PATENT DOCUMENTS

| | | | |
|---|---|---|---|
| 2,665,452 | 1/1954 | Beattie | 264/300 X |
| 2,992,939 | 7/1961 | Larson et al. | 428/425 X |
| 3,387,074 | 6/1968 | Hill | 428/425 X |
| 3,418,188 | 12/1968 | Hogg et al. | 156/246 |
| 3,538,055 | 11/1970 | Camilleri et al. | 428/425 X |
| 3,580,796 | 5/1971 | Hick et al. | 428/425 |
| 3,616,185 | 10/1971 | Goldberg | 428/425 X |
| 3,868,296 | 2/1975 | McKeon et al. | 428/417 X |
| 4,011,358 | 3/1977 | Roelofs | 428/425 X |
| 4,013,598 | 3/1977 | Evans et al. | 428/425 X |
| 4,020,204 | 4/1977 | Taylor et al. | 156/249 X |
| 4,025,678 | 5/1977 | Frank | 156/249 X |
| 4,029,534 | 6/1977 | Bocks et al. | 428/425 X |
| 4,045,269 | 8/1977 | Voss et al. | 156/246 X |

*Primary Examiner*—Harold Ansher
*Attorney, Agent, or Firm*—McWilliams & Mann

[57] ABSTRACT

Rigid composite articles comprising a relatively thin, impression-retaining surface formed of a hard, rigid, room-temperature cured urethane resin and a relatively thick backing and reinforcing are made by casting a thin layer of urethane resin on the surface of a master, curing the urethane, then casting thereon a relatively thick backing layer of a casting material such as plaster or resin.

5 Claims, No Drawings

RIGID COMPOSITE ARTICLES AND A METHOD FOR THEIR MANUFACTURE

BACKGROUND OF THE INVENTION

This invention relates to rigid composite articles and a method for their manufacture. More particularly the invention relates to rigid composite articles having a relatively thin, impression-retaining molded surface portion and a thick backing portion to support and reinforce the impression-retaining molded surface portion, and to a method for their manufacture.

In the metal working art, patterns, models, mold cavities and duplicator models are required having hard rigid surfaces which accurately retain the molded dimensions and which will not bend, deflect or warp in use during machining and foundry operations such as mold preparation and machine duplication. In many instances the patterns and models are prepared by hand, or, where a multiplicity of the patterns or models is required, by replication of a master. Replication of the master is frequently accomplished by for example casting in bulk materials such as plaster. However, particularly where the article to be replicated is large, bulk casting materials undergo a large amount of shrinkage during curing, and consequently allowances for these large dimensional changes must be made in designing and making the master. Further, where the surface of the pattern is expected to undergo wear, as for example in duplicator models, plaster models have insufficient surface hardness to withstand repeated use without undue wear and loss of dimensional accuracy. Rigid thermoset resins having a high degree of surface hardness may be employed to overcome the problem of surface wear, however the cost of such materials particularly for making large parts may be prohibitive. Resin-fiberglass composites are also frequently employed in the pattern making art. These composites employ as the first, impression-retaining portion a gel-coat resin which is cast on the surface of the master, partially-cured to obtain a gelled or semiset surface layer, and then backed and reinforced by layers of fiberglass and resin. The completed composite structure must then be allowed to fully cure before use. A particular disadvantage of these latter systems lies in the necessity for obtaining a partial cure of the gel coat prior to adding the fiberglass-resin backing. Where the gel-coat is given no cure, the backing layers displace the gel-coat resin from the surface of the master, and where the gel coat is first permitted to completely cure before adding fiberglass layers, the backing layers adhere poorly if at all to the gel coat and provide inadequate reinforcement. The times required to cure first the gel coat and then the fiberglass-resin backing are relatively long, and the forming of models and patterns by these prior art methods is thus a slow and timeconsuming process.

SUMMARY OF THE INVENTION

The composite articles of the present invention comprise a relatively thin impression-retaining surface portion or shell formed of a cured urethane resin, and a relatively thick backing portion formed of plaster of a cured casting resin. The composite articles are formed by coating the surface of a master with a relatively thin layer of room temperature curable urethane resin, allowing the urethane shell or coating to cure, then casting a thick layer of plaster or curable resin over the coating to provide a reinforcing backing. The urethane resin is formulated to be rigid and have a high degree of surface hardness on curing. By applying the urethane as a relatively thin shell or coating, bulk shrinkage of the material is minimized. A sharp and dimensionally-accurate impression of the master surface is thus retained and reproduction of intricate detail and surface features without loss of sharpness and clarity is thus made possible. The backing material, which is subsequently cast or laid to the back of the impression-retaining cured urethane shell and then cured in place may be made to any desired thickness. Bulk shrinkage of the backing material will not affect the dimensional accuracy of the impression-retaining surface, and thus the backing material may be any material which will provide adequate reinforcement and which can be cast and cured in place in a reasonably short time period.

DETAILED DESCRIPTION

In the practice of this invention, the surfaces of the master, such as an object to be replicated or a mold cavity, are first coated with a mold release material or parting agent. Any of the variety of mold release materials including wax, silicone polymers and tetrafluoroethylene polymers which are widely available and commonly used in the plastic manufacturing arts may be employed for these purposes.

After application of the mold release, a coating of a liquid polyurethane resin is applied to surfaces of the master. The polyurethane resin is applied in the catalyzed, substantially uncured state to a thickness of from about 0.0675 in. to about 0.25 in. and allowed to cure to form a relatively thin, rigid, impression-retaining shell or surface layer.

A backing layer is next applied to the cured urethane shell. Preferably the backing material will be a casting material such as for example plaster of paris or a casting resin which can be poured onto the surface and which will rapidly cure or set in place.

The resulting composite article, after the master is removed, comprises a relatively thin shell formed of cured urethane resin which retains an accurate impression of the surface of the master, and a thick reinforcing portion or backing. The urethane shell, being hard and highly resistant to abrasion, provides a surface suitable for repeated use in mold-making and duplicating operations which will resist loss in dimensional accuracy through abrasion and wear. The thick backing material provides adequate support and reinforcing for the thin shell, and prevents warping or deformation of the shell during use.

The urethane resin suitable for the purposes of this invention will be a liquid casting urethane resin particularly formulated to be hard and rigid on curing, with a durometer hardness in the range of from about 65 to 90 Shore D hardness. For many end-uses in the metalworking arts these composite articles will be subjected to surface abrasion, and it is therefore essential that the urethane resist wear and deformation under load. Very hard surface properties are thus necessary and the softer, elastomeric urethanes having a Shore durometer hardness substantially below a Shore D value of about 65 will thus be unsuitable for the purposes of this invention. Those with greater hardness, particularly those with a Shore D value above about 75 will be preferred.

The liquid urethane resins suitable for the purposes of this invention are further characterized by having a very short pot life or gel time at or near room temperature when catalyzed, and in particular will have a pot life of less than 20 minutes, and more preferably will gel or set in less than about 10 minutes after mixing with the necessary catalyst. It will be seen that the very short gel times of these resins will permit rapid production of replicas by minimizing the time for preparation of the impression surface portion prior to application of the backing and reinforcing portion. The resins are generally obtained commercially as a two-part system, including a viscous liquid prepolymer and a curing or hardening component. The two components are mixed immediately prior to use to provide a viscous pourable liquid which is them immediately applied to the prepared surface of the master by pouring and/or brushing to the desired thickness. Alternatively, the components may be simultaneously mixed and sprayed on the surface of the master using a conventional spray gun device having a mixing head separately supplied with prepolymer and catalyst or hardner. The particular method of application selected, as well as the area and size of the master surfaces being coated, will in part determine the optimum gel time or pot life for the resin, which need only be long enough to permit coating the surfaces of the master.

The viscosity of the catalyzed resin will depend in part upon the particular resin system employed and the amount of mineral filler, if any, mixed therewith. Where the application viscosity of the resin as supplied is too great for convenient brush application to the surfaces of the master, or where spray application is contemplated, the viscosity may be adjusted downward by first mixing with the prepolymer component a compatible solvent. Any of the non-reactive solvents widely employed in the urethane art, including acetone, methyl ethyl ketone, toluene and the like may be employed to modify the application viscosity of the resin. Such solvents must be sparingly employed and should not exceed 10% by weight of the total catalyzed resin, inasmuch as the use of volatile solvents increases the time required to obtain a cured, dimensionally stable molding free of volatiles.

The urethane resin systems may be further compounded if desired with inert fillers, including silica, talc, calcium carbonate, whiting and the like in order to increase the density and rigidity of the final article. Further, the use of various pigments to obtain improved cosmetic appearance where a decorative end use for the composite article is contemplated is within the scope of the practice of this invention.

It will be understood that the bulk casting of thick articles from urethane resins including low temperature-curing resins is widely practiced. Cast articles prepared by this process normally will require a post-curing time at elevated temperatures or an extended post-cure at room temperature for the full properties of the resin to be achieved. In the present invention, where the casting takes the form of a relatively thin shell, the final part requires no further cure and may be employed immediately after initial cure at room temperature has taken place and the backing layer has been applied.

The backing layer material will most conveniently be formed of quick-setting casting material such as plaster or a liquid resin which will rapidly cure at room temperature, such as an epoxy resin, a urethane resin, or the like. The backing layer material will normally be poured in the catalyzed, uncured state directly onto the urethane shell layer to any desired thickness. Where the master is a cavity mold, the backing material will be used to fill and mold cavity, and where the master is a pattern, the shell-coated master will be placed in a box or other container open at the top and the backing layer material will be cast over the shell to the desired depth to provide adequate backing and reinforcement. Inasmuch as the preformed urethane shell possesses the necessary hardness and abrasion resistance and retains the impression of the surfaces of the master, the backing material need only be capable of being cast in place to thereby provide intimate contact with the back surfaces of the shell, and of rapidly setting or curing at room temperature to form a hard dense material in order that production of the composite article will be conveniently rapid.

The normal physical adhesion between the urethane shell portion and the backing material when cured will generally be sufficient for most applications; however where greater adhesion is desired for a particular purpose, any of a number of adhesive compositions may be applied to the back of the shell just prior to casting the backing material thereon. The physical adhesion between a cured urethane shell and a subsequently applied backing material, such as, for example plaster of paris or a casting urethane resin is generally only fair to poor. Though the adhesion may be sufficient for many end uses, such as for example as casting molds, certain metal working applications, such as, for example, machine duplicating may require a more secure bond between the shell and the backing portion. Application of any of the commonly available epoxy adhesive preparations as a thin coating to the back of the shell just prior to casting the plaster or urethane will markedly improve the adhesion between the shell and the backing for these purposes.

The invention will be better understood by consideration of the following specific examples.

EXAMPLE 1. PREPARATION OF A CAVITY MOLD

A metal master in the form of an intricately-detailed figurine depicting the head of an American Indian was secured to a backing board placed in the bottom of an open-topped box form. The master, the backing board and the walls of the box were coated on the exposed surfaces with a wax mold release, obtained as APCO 0051 from Applied Plastics Co., El Segundo, California.

A two-part urethane casting resin system, obtained from Thermocast International, Inc., Benton Harbor, Michigan, was prepared for use by mixing equal parts by volume of the resin prepolymer, identified as Accracool 701, and the hardner or curative, identified as Accracool 721. The mixture had a pot life of 5 minutes to gel, and a viscosity of 5340 cps. The casting urethane, immediately after being mixed, was cast directly onto the master surfaces and spread with a spatula to obtain an essentially uniform ¼inches coating over the master, the backing board and the side walls of the box. The urethane gelled in place, and the resulting shell was allowed to further cure at room temperature for about one hour. The cured urethane had a Shore durometer hardness of 65D in 30 minutes, and 75D in one hour.

The back surfaces of the shell were then brushcoated with an epoxy adhesive, obtained as Surface Coat epoxy system 141/164 from Thermocast International Inc. After about 10 minutes, when the epoxy adhesive had set, the shell was backed by pouring a casting plaster over the shell to the depth of the box and allowing the plaster to set.

The resulting composite article, after being removed from the master and the box, was a cavity mold replica of the figurine. The intricate detail of the master was accurately retained in the surface of the thin urethane shell, and sufficient rigidity and strength was provided by the thick plaster backing for the mold to be employed in casting operations with a variety of materials including casting resins and the like.

EXAMPLE 2. REPLICATION FROM A CAVITY MOLD.

The impression surfaces of the cavity mold produced in Example 1 were first coated with a wax parting agent. The Accracool 701/721 casting resin system set forth in Example 1 was mixed in equal volumes as before, together with 5 volume per cent of methyl isobutyl ketone to reduce the viscosity of the mixed system to about 2000 cps. for ease of application. The mixture was then poured into the mold cavity and spread by brushing onto the impression surfaces to an average thickness of ⅛ inches and allowed to gel in place. Gel time of the casting resin-solvent mixture was approximately 5 minutes at room temperature. The gelled coating was allowed to further cure for about 1 hour. The shell was then backed by filling the cavity with an epoxy casting resin obtained from Thermocast International Inc. as Epoxy Casting System 221/242. The Epoxy System is characterized as having a pot life of 70 minutes after mixing, and cures at room temperature with a 160° F. exotherm. The epoxy backing was allowed to thoroughly cure.

The resulting composite article, after being removed from the mold cavity, was a replica of the original metal master employed in Example 1, with accurate retention of intricate detail in the relatively thin urethane shell and having strength and rigidity provided by the thick cast resin backing. This composite article may be employed directly as a secondary master to produce further cavity molds, as a duplicator model in metal machining operations where the hard, wear-resistant urethane surfaces will resist wear and abrasion, or as a decorative article.

EXAMPLE 3. REPLICATION IN A CAVITY MOLD TO PROVIDE A COMPOSITE ARTICLE WITH LAMINATE BACKING.

The mold cavity was coated first with mold release, then with a brushed-on coat of urethane casting resin, following the procedure of Example 2. The resulting shell, after curing, was then backed by overlaying with conventional fiberglass mat impregnated with a conventional liquid epoxy resin containing curing catalyst. The resin-fiberglass composite layer was allowed to fully cure at room temperature. When removed from the mold cavity, the resulting replica was a composite article having a relatively thin (⅛ inches) impression-retaining shell formed of rigid urethane with a Shore durometer hardness of 80D, backed and reinforced by an approximately 1 inches thick layer of cured, fiberglass filled resin.

Backing layers formed from fiberglass-resin compositions are less dense than the plaster and casting resins employed in Examples 1 and 2 respectively, and form strong backing layers having adequate reinforcing characteristics without being made unduly thick. The resulting composite articles are lighter in weight, and this method of backing the thin urethane shell portion will thus be particularly advantageous where making large models and replicas is contemplated.

It will be understood that a variety of conventional casting urethane systems are commercially available which possess the pot life and durometer hardness properties necessary for use in producing the thin urethane shell or surface portion of the composite articles of the instant invention. In addition to the Accracool 701/721 system employed in the Examples, other commercially available systems which have been successfully employed include APCO Fastform 2520 casting compound, from Applied Plastics Co., Inc., El Sequndo, California, which has a pot life of 5 minutes after mixing, and a Shore durometer hardness of 85D, and Multi-Cast Fast Reproducing Plastic from Kendt-Collins Co., Cleveland, Ohio, with a pot life of 5 minutes and a Shore Durometer Hardness of 80D.

It will be understood that the particular backing material employed will be selected in part for ease of application, ready availability and low cost. For that reason, where rapid-setting epoxy or urethane resins are to be employed, they may be filled with a low cost, nonreactive mineral filler such as silica, talc, calcium carbonate and the like, to decrease cost and increase the density of the final composite.

It will also be understood that the urethane shell may be backed with a layered or laminated composite material, such as for example a glass cloth-resin laminating combination or by sprayed-on layers of glass fiber and resin to achieve a particular rigidity or strength in the final composite, and composite articles employing these backing materials will be also included within the scope of the instant invention.

The composite articles of this invention are useful in the metal working arts as patterns, duplicator models and the like. Where the composite article is a negative replica of an article of pattern, the article may be employed as a cavity mold in plastic casting or the like to provide replicas of the original article or pattern. Where the composite article of this invention is formed in a cavity mold, it then becomes a positive replica, useful as a pattern of duplicator model. Additionally, the method of this invention may be employed to provide decorative articles in the form of plaques and molded articles wherein the urethane shell portion is formed of a urethane resin particularly formulated to provide attractively and decoratively pigmented surfaces.

The invention will thus be seen to be composite articles comprising a relatively thin, impression-retaining surface portion formed of a rigid hard urethane resin and a relatively thick backing and reinforcing portion formed of a cast material, and a method for their manufacture.

What is claimed is:

1. A method for forming a rigid composite article comprising an outer impression-retaining thin surface layer and a relatively thick backing layer comprising (a) providing a master having coated on the surfaces therof a mold release material, (b) coating the surfaces of the master with a catalyzed liquid urethane resin. (c) curing said urethane resin to form a rigid surface layer having a thickness of from about 0.0675 inch to about 0.25 inch and a Shore durometer hardness of from about 65D to about 90D, (d) placing on the back surface of said rigid surface layer a relatively thick backing layer of a curable material, (e) curing said backing layer, and (f) recovering the rigid composite article so produced.

2. The method of claim 1 further comprising the step of coating the back surface of said rigid surface layer with an epoxy adhesive prior to the step of placing thereon said backing layer.

3. The method of claim 1 wherein the curable material is plaster of paris.

4. The method of claim 1 wherein the curable material is selected from the group consisiting of epoxy resin and urethane resin.

5. The method of claim 4 wherein the curable material further includes a filler selected from the group consisting of mineral fillers and glass fibers.

* * * * *